US009588919B2

(12) United States Patent
Nanduri et al.

(10) Patent No.: US 9,588,919 B2
(45) Date of Patent: Mar. 7, 2017

(54) METHODS AND SYSTEMS FOR I/O CANCELLATION

(71) Applicant: Nimble Storage, Inc., San Jose, CA (US)

(72) Inventors: Anil Nanduri, Sunnyvale, CA (US); Chunqi Han, Pleasanton, CA (US); Murali Krishna Vishnumolakala, Sunnyvale, CA (US)

(73) Assignee: NIMBLE STORAGE, INC., San Jose, CA (US)

( * ) Notice: Subject to any disclaimer, the term of this patent is extended or adjusted under 35 U.S.C. 154(b) by 5 days.

(21) Appl. No.: 14/555,904

(22) Filed: Nov. 28, 2014

(65) Prior Publication Data

US 2015/0100709 A1    Apr. 9, 2015

Related U.S. Application Data

(63) Continuation of application No. 14/048,018, filed on Oct. 7, 2013, now Pat. No. 8,924,607.

(51) Int. Cl.
*G06F 13/28*    (2006.01)
*G06F 12/10*    (2016.01)

(52) U.S. Cl.
CPC .......... *G06F 13/28* (2013.01); *G06F 12/1081* (2013.01)

(58) Field of Classification Search
CPC .............................. G06F 12/1081; G06F 13/28
USPC .......................................................... 710/25
See application file for complete search history.

(56) References Cited

U.S. PATENT DOCUMENTS

| 5,388,254 A | 2/1995 | Betz et al. | |
| 6,725,289 B1* | 4/2004 | Waldspurger | G06F 12/1081 710/2 |
| 9,280,380 B2* | 3/2016 | Tsirkin | G06F 9/45558 |
| 2012/0311202 A1 | 12/2012 | Aslot et al. | |
| 2013/0339632 A1* | 12/2013 | Yamashita | G06F 12/0284 711/148 |

OTHER PUBLICATIONS

Canceling I/O Requests; http://msdn.microsoft.com/en-us/library/windows/hardware/ff540733(v=vs.85).aspx, accessed Sep. 13, 2013; 2 pages.

(Continued)

*Primary Examiner* — Chun-Kuan Lee
(74) *Attorney, Agent, or Firm* — Ascenda Law Group, PC

(57) ABSTRACT

Described herein are techniques for cancelling I/O requests. Initially, virtual memory of an application is assigned to a first portion of memory. The application may issue a read request to an external device. The external device is instructed to record any response to the read request in the first portion of memory. The read request may be cancelled as follows. The virtual memory of the application may be re-assigned to a second portion of the memory. If and when the external device finishes processing the read request, the external device's response to the read request may still be saved in the first portion of memory, even though the read request has been cancelled. Such action of the external device would ordinarily corrupt the virtual memory of the application, but due to the memory re-assignment, no corruption of the virtual memory occurs. Similar techniques may be applied to cancel write requests.

12 Claims, 10 Drawing Sheets

(56) References Cited

OTHER PUBLICATIONS

Canceling Pending I/O Operations (Windows); http://msdn.microsoft.com/en-us/library/windows/desktop/aa363789 (v=vs.85).aspx; accessed Sep. 13, 2014; 6 pages.
Office Action dated Oct. 29, 2014, from U.S. Appl. No. 14/048,018, filed Oct. 7, 2013, 7 pages.
Response to Office Action filed Oct. 31, 2014, from U.S. Appl. No. 14/048,018, filed Oct. 7, 2013, 9 pages.
The NT Insider: A Modest Proposal—A New View on I/O Cancellation; http://www.osronline.com/article.cfm?id=37; accessed Sep. 13, 2013; 4 pages.

* cited by examiner

METHODS AND SYSTEMS FOR I/O CANCELLATION

RELATED APPLICATIONS

This application is a Continuation of U.S. application Ser. No. 14/048,018 filed on Oct. 7, 2013, now U.S. Pat. No. 8,924,607, incorporated herein by reference.

FIELD OF THE INVENTION

The present invention relates to methods and systems for processing input/output (I/O) requests, and more specifically relates to techniques for cancelling I/O requests.

BACKGROUND

An essential task for many computer systems is the handling of input/output (I/O). For example, to save data, a computer system typically transfers data from temporary data storage, such as random access memory (RAM), to more permanent data storage, such as a hard drive (e.g., magnetic storage device). From the perspective of the computer system (more specifically a central processing unit (CPU) and main memory of the computer system), such data transfer involves the output of data. As another example, to display a webpage on a computer monitor, a computer system might receive data encoding the webpage from one or more servers (i.e., input from the perspective of the computer system) and might transmit data encoding the webpage to a monitor (i.e., output from the perspective of the computer system).

One component that may oversee the processing of I/O is the CPU of the computer system. Two common techniques used by the CPU to mediate communication with an "external device" (or I/O device) are polling and interrupt-driven I/O. Any device which is external to the CPU and its associated main memory may be referred to as an external device. An external device may include a hard drive, a solid state drive (SSD), a monitor, a keyboard, a microphone, etc.

In polling, a CPU periodically queries an external device to see whether the external device is ready to receive data from the CPU or transmit data to the CPU. While polling is relatively simple to implement, it may be quite inefficient, unnecessarily consuming resources of the CPU while an external device is not ready to handle I/O. In contrast to polling, with interrupt-driven I/O, an external device may send an interrupt to the CPU when it is ready to receive data from the CPU or transmit data from the CPU. Therefore, with interrupts, a CPU only needs to communicate with an external device while it is actively servicing I/O.

However, even the servicing of I/O may consume much of the computing resources of the CPU. In the case of transferring a large file from main memory to a storage device, a CPU may need to oversee the transfer of each data block of the file from the main memory to the storage device, which may take many cycles of the CPU's time. If the large file were a video and the CPU had limited computing power (e.g., lower clock frequency), the storage of the video might consume much of the CPU resources, slowing the CPU's response to other tasks. One solution used to address such predicament is a direct memory access (DMA) controller (also known as a DMA engine). With a DMA controller, the handling of I/O can be assisted by the DMA controller, freeing up the CPU for other tasks.

More specifically, the handling of I/O assisted by a DMA controller may begin with the CPU issuing an I/O request (either to the DMA controller or to the external device). The DMA controller then works with the external device to complete the I/O request (i.e., transferring data from the main memory to the external device or transferring data from the external device to the main memory). Such step may be called a DMA transfer. Upon completion of the I/O request, the DMA controller may send an interrupt to the CPU, alerting the CPU to the completion of the I/O request. A DMA transfer is asynchronous in the sense that the CPU does not have control of when the DMA transfer actually happens.

While a DMA controller provides the above-noted benefits of freeing the CPU for other tasks, it also introduces some challenges when I/O requests need to be cancelled. To illustrate the need for the cancellation of an I/O request, an application may request data from a device (i.e., the I/O request being a read request in this example), but at a later point may need to cancel the I/O request upon realizing that the data is no longer needed. In a not uncommon scenario, an I/O request may take longer to complete than expected, and becoming impatient, a user may attempt to cancel the I/O request.

When a CPU is overseeing an I/O request (without the assistance of a DMA controller), the CPU can make sure that the I/O request is canceled by (i) sending a reset or cancellation message to the external device and (ii) in the event that the external device still provides a response to the I/O request, not writing the response to the main memory. The addition of the DMA controller may introduce some complications. When a CPU is overseeing an I/O request (with the assistance of a DMA controller), the CPU may similarly send a reset or cancellation message to the external device. However, in the event that the external device still provides a response to the I/O request (e.g., the external device fails to handle the cancellation request properly, there is a bug in the implementation of the reset logic of the external device, etc.), the DMA controller may write the response to the main memory. Such action of the DMA may corrupt the main memory of the computer system.

SUMMARY OF THE INVENTION

In one embodiment of the invention, an improved I/O cancellation technique is used to cancel a read request, the cancellation technique preventing the main memory of a computing system from being corrupted by an unanticipated/unwanted DMA transfer. Initially, virtual memory of an application is assigned to a first portion of the main memory. The application may issue a read request, which requests data to be transferred from an external device to its virtual memory. At a later time, the application (or a computer program overseeing the request, known as the kernel) may request the read request to be cancelled. In one embodiment of the invention, the cancellation of a read request may be initiated upon the read request exceeding a timeout value.

The kernel may first determine whether the read request has been transmitted from the computing system (e.g., transmitted to a host bus adaptor (HBA)). If not, the kernel may cancel the read request by removing the request from the request queue. If the read request has been transmitted from the computing system, the read request may be canceled via a memory swap operation.

In the memory swap operation, the virtual memory of the application is reassigned to a second portion of the main memory. In contrast to prior approaches which attempt to reset the external device's processing of the read request, the external device, in accordance with techniques of the present invention, is allowed to continue processing the read request. In the event that the external device is able to finish processing the read request, a DMA controller writes the external device's response (i.e., response to the read request) to the first portion of the main memory (i.e., formerly assigned to the virtual memory of the application). However, since the virtual memory of the application has been reassigned to a second portion of the main memory, such DMA transfer does not corrupt the virtual memory of the application.

Similar techniques may be applied to cancel a write request in order to prevent the data of the external device from being corrupted. Initially, virtual memory of an application is assigned to a first portion of the main memory. The application may issue a write request, which requests data to be transferred from the computing system to the external device. In many cases, such data will be data of the application, so the data is resident in the virtual memory of the application (i.e., first portion of the main memory). At a later time, the application (or a computer program overseeing the request, known as the kernel) may request the write request to be cancelled. In one embodiment of the invention, the cancellation of a write request may be initiated upon the write request exceeding a timeout value.

The kernel may first determine whether the write request has been transmitted from the computing system (e.g., transmitted to a host bus adaptor (HBA)). If not, the kernel may cancel the write request by removing the request from the request queue. If the write request has been transmitted from the computing system, the write request may be cancelled via a memory swap operation. In the memory swap operation, the virtual memory of the application is reassigned to a second portion of the main memory, similar to the above-described cancellation of a read request. The benefits, however, of the memory swap are different, as the memory swap operation in a write request cancellation prevents the data of the external device from being corrupted, rather than preventing the virtual memory of the application from being corrupted.

Specifically, the concern is that following an attempt to cancel a write request, the application may assume the write request has been cancelled successfully, and therefore releases the first portion of main memory (e.g., making the first portion available for other uses). At the same time, the external device may not process the cancellation of the write request successfully (e.g., a controller within the external device may be experiencing failure, etc.). A DMA transfer may still continue, transferring data from the first portion of main memory to the external device. If new data is written to the first portion of main memory (which is possible since the memory has been released), such new data may be inadvertently written to the external device, corrupting the contents of the external device. As a result of the memory swap operation, the application is decoupled from the first portion of the main memory (specifically its virtual memory is no longer associated with the first portion of the main memory), precluding the above-described potential corruption of the data of the external device.

Such I/O cancellation technique has several advantages. First, the application may experience very little delay from the cancellation of the I/O request and/or can be provided an upper limit on how long it must wait until it may continue with its processing (e.g., how long it must wait until it can resume use of its virtual memory). Upon either the I/O request being removed from the request queue of the computing system or the virtual memory of the application being reassigned from the first portion to the second portion of the main memory, the application can immediately continue with its processing (e.g., it may use its virtual memory without the possibility of its virtual memory being unexpectedly/unintentionally corrupted by the external device's response to the I/O request). The application need not wait for any response from the external device before continuing with its processing.

Second, there are advantages to allowing the external device to continue with its processing of the I/O request. Typically, when an external device, such as a storage device, takes a long time to respond to an I/O request, it may be experiencing technical issues (e.g., data may be corrupted in the storage device, a controller within the storage device may be experiencing failure, etc.). Sending one or more reset or cancellation requests to an external device experiencing technical issues may inadvertently exacerbate its problems (i.e., in addition to resolving the ongoing technical issues, it must now also devote resources to address the reset request) and eventually lead to a catastrophic failure of the external device, in which the external device is unable to recover without human intervention (e.g., an administrator may be required to power off and power back on the external device). Allowing the external device to continue its processing of the I/O request avoids these problems.

There are further advantages to allowing the external device to continue with its processing of the I/O request. In some instances, the reset of an external device may not succeed, and a reset of a larger scope may be needed. This may expand the error condition to other devices and may have system-wide effects. For example, if an HBA is reset, all disks on the same HBA may be reset and many more I/O requests will fail and need to be retried. Again, allowing the external device to continue its processing of the I/O request avoids these problems.

In yet another reason to allow the external device to continue with its processing of an I/O request, cancelling the I/O request, while the external device is busy executing error code paths, exposes the firmware on the external device to the possibility of encountering more bugs, as this code path might not be very well tested by the external device manufacturers. Again, allowing the external device to continue its processing of the I/O request avoids these problems.

Lastly, as already described, the virtual memory of the application does not become corrupted, even if the external device responds to the I/O request and the DMA controller writes such response to the main memory.

These and other embodiments of the invention are more fully described in association with the drawings below.

BRIEF DESCRIPTION OF THE DRAWINGS

The present invention is illustrated by way of example, and not limitation, in the figures of the accompanying drawings in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Figure 1:
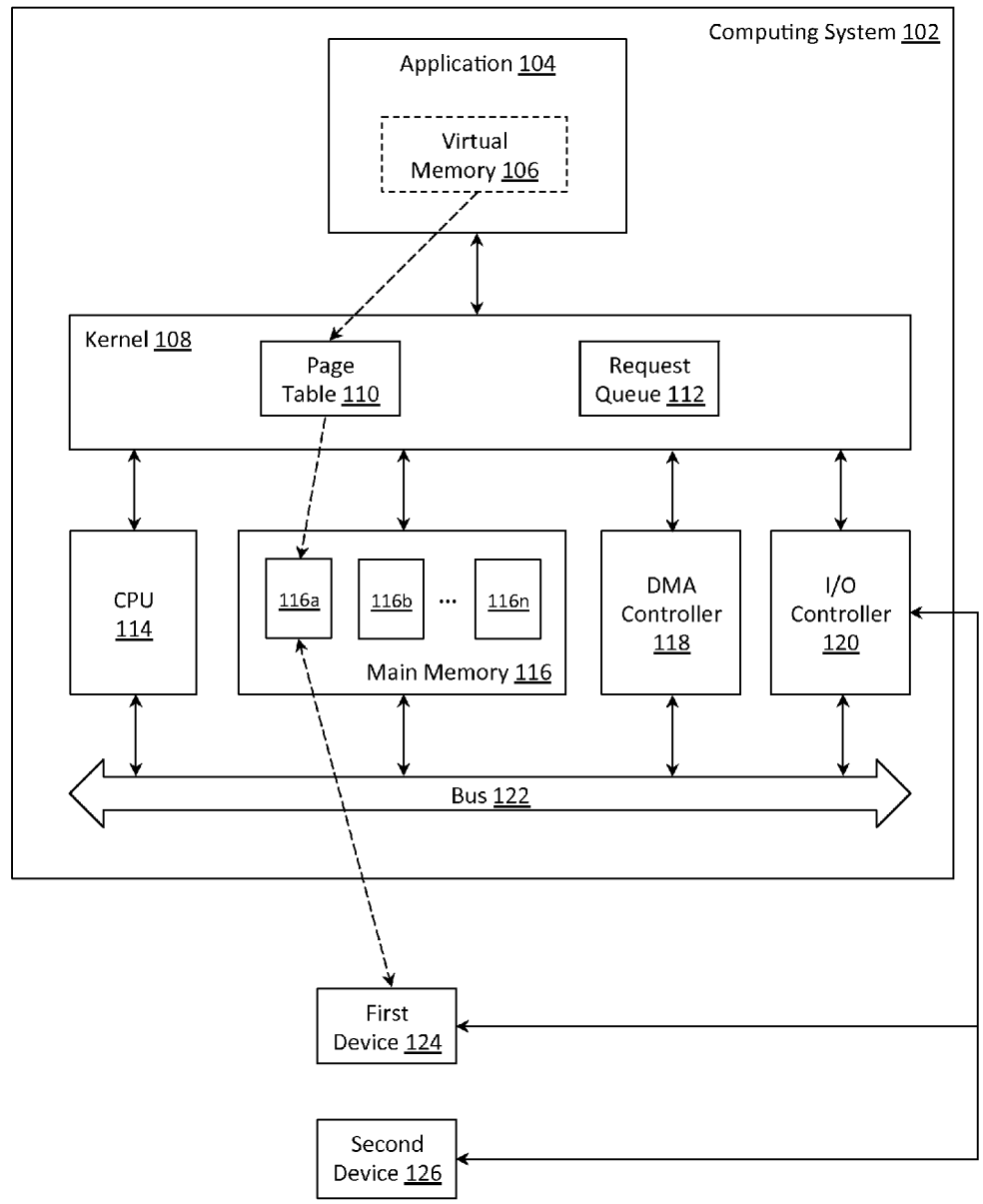
FIG. 1 depicts a computer system before a memory swap operation, in accordance with one embodiment of the invention.

FIG. 1 depicts computing system 102 communicatively coupled to first device 124 and second device 126, while computing system 102 may more generally be coupled to any number of devices. First device 124 and second device 126 may each be a storage device, such as a solid-state drive (SSD), a magnetic disk drive, an optical disk drive, etc. More generally, first device 124 and second device 126 may each be any I/O device, such as a keyboard, monitor, modem, microphone, etc. The communication means between computing system 102 and external devices (124 and 126) may be a wired or wireless connection, a computer network such as a LAN or WAN, a private or public computer network, etc.

Within computing system 102 is kernel 108. As is known in the art, kernel 108 is a component (i.e., a computer program) of an operating system which interfaces software applications to the hardware components of a computer system. In FIG. 1, only one software application 104 (called an "application" for brevity) is communicatively coupled to kernel 108, while in general any number of applications may be communicatively coupled to kernel 108. Kernel 108 may be communicatively coupled to the hardware components of a CPU 114 (or more generally any processor, microcontroller, etc.), main memory 116, direct memory access (DMA) controller 118 and I/O controller 120. CPU 114, main memory 116, DMA controller 118 and I/O controller 120 may further be communicatively coupled to one another via bus 122. Bus 122 may be a PCI bus, an ISA bus or other bus capable of communicatively coupling the hardware component of computer system 102.

A component of kernel 108 is page table 110 (or more generally a memory management unit or a memory map) which maps virtual addresses to physical addresses of main memory 116. Virtual addresses are typically assigned to an application in range(s) of virtual addresses, called a virtual address space. One range of virtual addresses may be mapped to several non-contiguous ranges of physical addresses via the page table. Hence, virtual addresses gives a user (or an application) the impression that he/she (or it) is utilizing a few large contiguous block(s) of memory, while in reality he/she (or it) may be utilizing many small non-contiguous blocks of memory (i.e., many fragmented portions of memory).

Further, it is possible that there are more virtual addresses than physical addresses. Therefore, two distinct virtual addresses may map to the same physical address. If this happens, two virtual addresses that map to the same physical address are typically not used simultaneously, preventing the possibility of memory corruption.

The memory referenced by a virtual address space is known as virtual memory. By mapping virtual addresses to physical addresses, page table 110 in turn assigns virtual memory to a certain portion of main memory. Virtual memory is not a hypothetical or an imaginary memory; rather, it corresponds to a certain portion of main memory 116. When it is stated that data is stored in virtual memory, data is actually stored in a certain portion of main memory 116. Portions of main memory have been illustrated as 116a, 116b, . . . 116n. While each portion has been depicted a contiguous region for simplicity of illustration, each portion in most cases consists of many non-contiguous regions in practice. In FIG. 1, page table 110 assigns virtual memory 106 of application 104 to portion 116a. To help illustrate the assignment of virtual memory 106 to portion 116a, a dotted arrow is drawn from virtual memory 106 to page table 110 and another dotted arrow is drawn from page table 110 to portion 116a.

Another component of kernel 108 is request queue 112. Request queue 112 is a collection (possibly an ordered collection) of I/O requests from application 104 and possibly other applications (not depicted). An I/O request may be a write request, requesting data to be transmitted from computing system 102 to one or more of devices 124 and 126. In addition, or alternatively, an I/O request may be a read request, requesting data to be transmitted from one or more of devices 124 and 126 to computing system 102. I/O requests may be ordered according to how quickly each I/O request needs to be serviced, with more urgent I/O requests placed at the front of the request queue and less urgent I/O requests placed at the back of the request queue. I/O requests may also be ordered in an order in which the I/O requests are received. Therefore, I/O requests may be serviced on a "first come first served" basis. It is noted that while page table 110 and request queue 112 have been depicted as components of kernel 108, more generally, page table 110 and request queue 112 may be components separate from kernel 108.

I/O requests in request queue 112 may be transmitted to DMA controller 118 and/or I/O controller 120 by kernel 108. In turn, DMA controller 118 and/or I/O controller 120 may transmit the I/O requests to the intended external device. In the example of FIG. 1, the external devices are first device 124 and second device 126. For ease of explanation, assume that the intended destination of an I/O request is first device 124. Upon first device 124 receiving the I/O request and finishing its processing of the I/O request, first device 124 may transmit data back to computer system 102 in response to the I/O request. Such data of first device 124 may first be transmitted to I/O controller 120. Under the control of DMA controller 118, such data from first device 124 may be written to a portion of main memory 116 without the assistance (or without disturbing) CPU 114. While DMA controller 118 has been depicted as a stand-alone component of computing system 102, DMA controller 118 may be configured differently in other embodiments. For example, DMA controller 118 may be a part of I/O controller 120 or may be resident on each of the external devices (124 or 126).

In many cases, an I/O request (particularly a read request) may specify a location in main memory 116 where any response to the I/O request should be written. If an I/O request is from an application, such location may be within the virtual memory of the application, such that the response to the I/O request can be easily accessed by the application. In the example of FIG. 1, DMA controller 118 is instructed to record any response of first device 124 to portion 116a of main memory 116. Such instruction may be delivered to DMA controller 118 as a part of the I/O request issued by application 104. In FIG. 1, a dotted arrow has been drawn between portion 116a of main memory 116 and first device 124 indicating the direct transfer of data between these two components. The transfer is direct in the sense that it bypasses any processing of CPU 114. The transfer is facilitated by DMA controller 118 and I/O controller 120 in the embodiment of FIG. 1, while such transfer may be facilitated by other like components in other embodiments. First device 124 being communicatively coupled to portion 116a typically lasts over the processing of a single I/O request. During the processing of a subsequent I/O request, first device 124 may be communicatively coupled to portion 116b, or other portion of main memory 116. Therefore, the dotted arrow between first device 124 and portion 116a depicted in FIG. 1 is a transitory link rather than being a permanent link.

The cancellation of I/O will now be briefly described with respect to the system diagrams of FIGS. 1-4, and subsequently will be described in more detail by way of the flow diagrams of FIGS. 5-9. Suppose that after issuing an I/O request to first device 124, application 104 cancels the I/O request. In prior approaches, kernel 108 may send a message to first device 124, attempting to cancel the first device's processing of the I/O request. However, in some instances, kernel 108 may be unable to cancel the first device's processing of the I/O request (e.g., the external device fails to handle the cancellation request properly, there is a bug in the implementation of the reset logic of the external device, etc.), and a response from first device 124 is written to portion 116a of main memory 116. As this response is no longer requested or expected by application 104, such action on the part of first device 124 (possibly with the assistance of DMA controller 118 and I/O controller 120) may inadvertently corrupt virtual memory 106 of application 104. Specifically, a concern is that if application 104 makes changes to the data in its virtual memory immediately after it cancels an I/O request, those changes could be written over by an ongoing DMA transfer (i.e., a DMA transfer that continues despite the application's attempt to cancel the I/O request).

Figure 2:
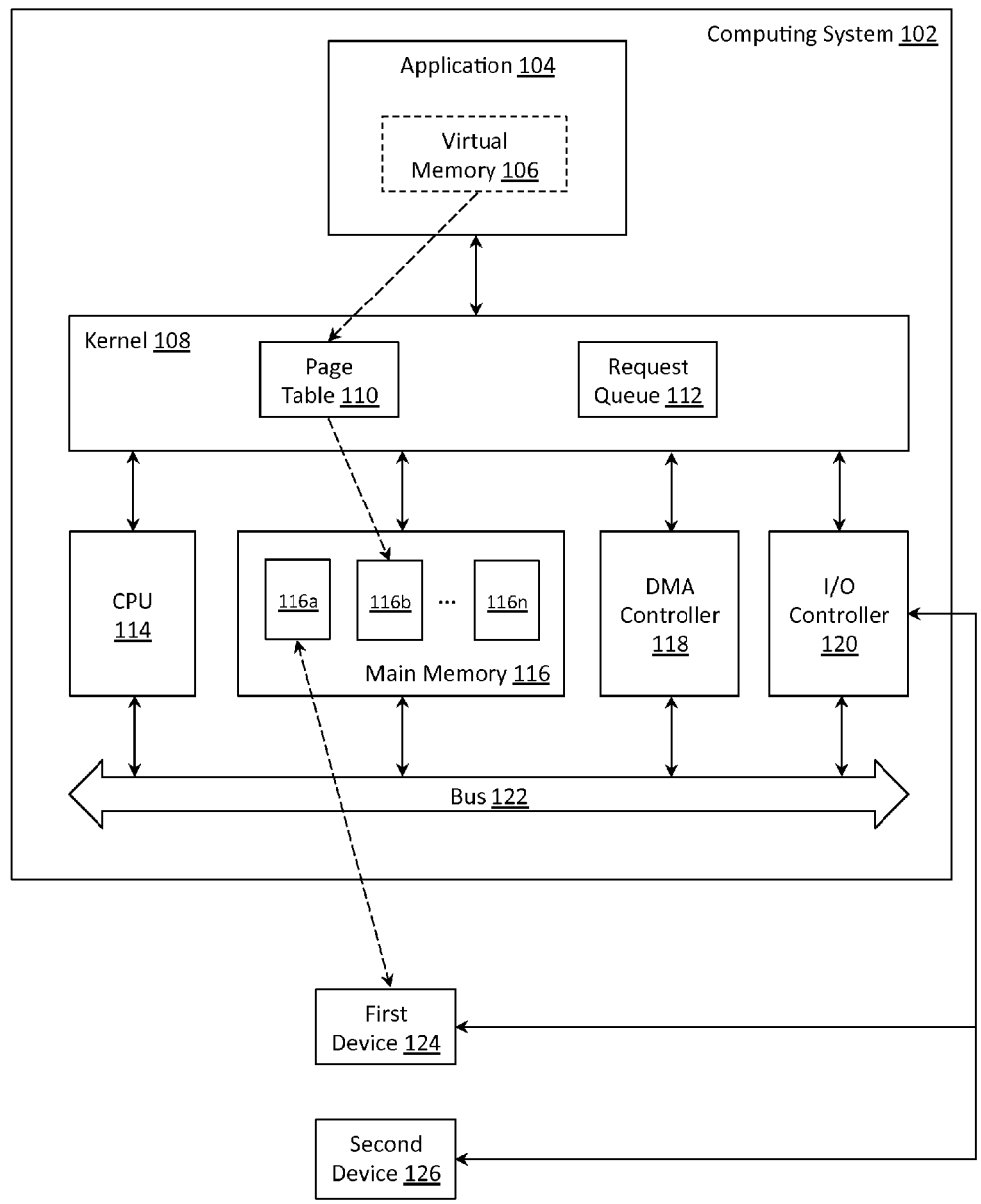
FIG. 2 depicts a computer system after a memory swap operation, in accordance with one embodiment of the invention.

FIG. 2 helps illustrate the improved I/O cancellation technique, in accordance with one embodiment of the invention. Upon receiving an instruction to cancel an I/O request, kernel 108 may first determine whether the I/O request is still in request queue 112. If so, it can cancel the I/O request by removing the request from request queue 112. If the I/O request is no longer in request queue 112, kernel 108 may cancel the I/O request via a memory swap operation. In the memory swap operation, virtual memory 106 of application 104 is reassigned to portion 116b of the main memory (such operation reflected in the dotted arrow from page table 110 to portion 116b). Portion 116b of the main memory may be identical in size to portion 116a of the main memory. In contrast to prior approaches which attempt to reset the first device's processing of the I/O request, first device 124, in accordance with techniques of the present invention, is allowed to continue processing the I/O request. In the event that first device 124 is able to complete its processing of the I/O request, DMA controller 118 may write the first device's response to first portion 116a of the main memory 116 (i.e., formerly assigned to virtual memory 106 of application 104). However, since virtual memory 106 of application 104 has been reassigned to portion 116b of main memory 116, such DMA transfer does not corrupt virtual memory 106 of application 104.

Figure 3:
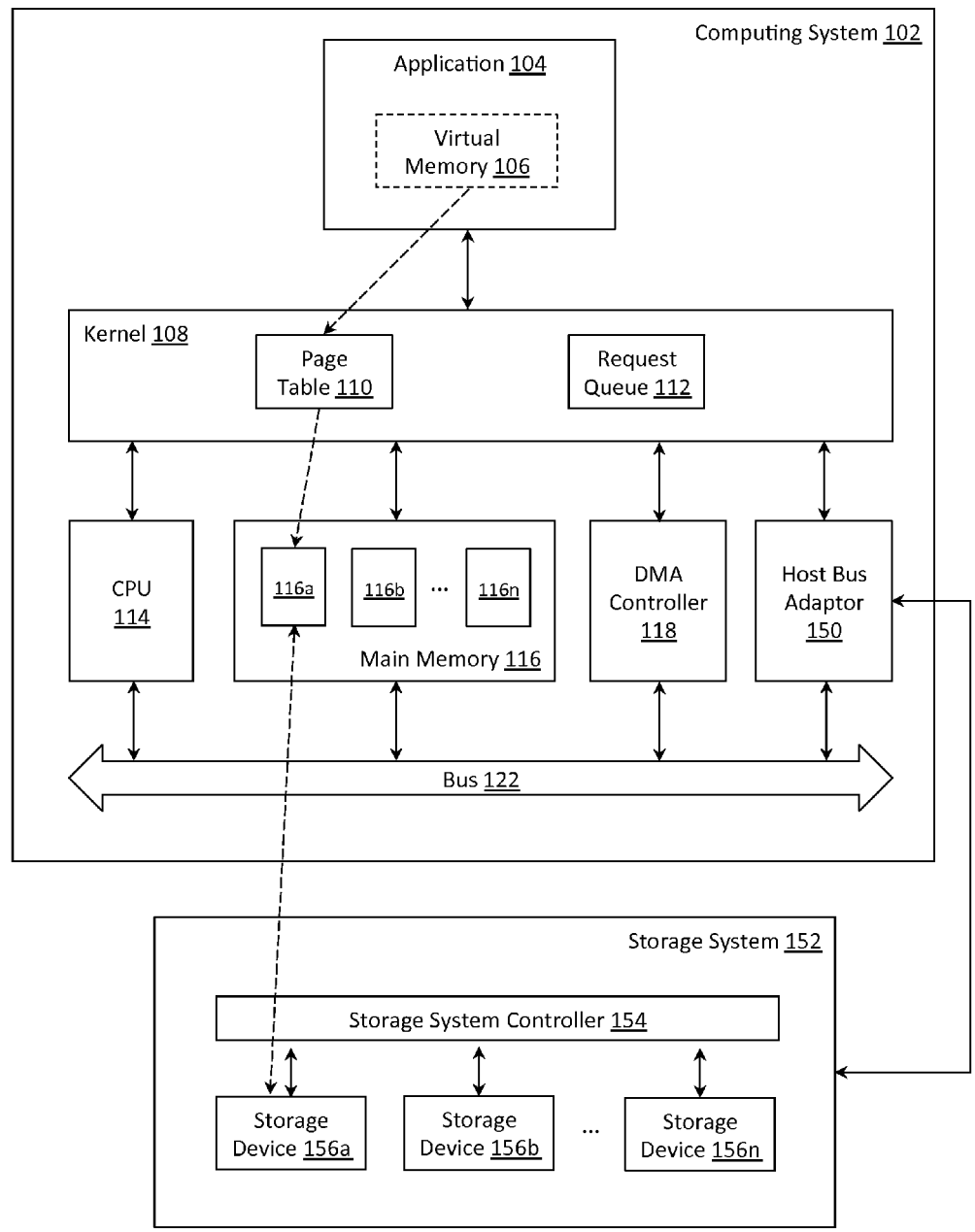
FIG. 3 depicts a computer system before a memory swap operation, in accordance with one embodiment of the invention.
Figure 4:
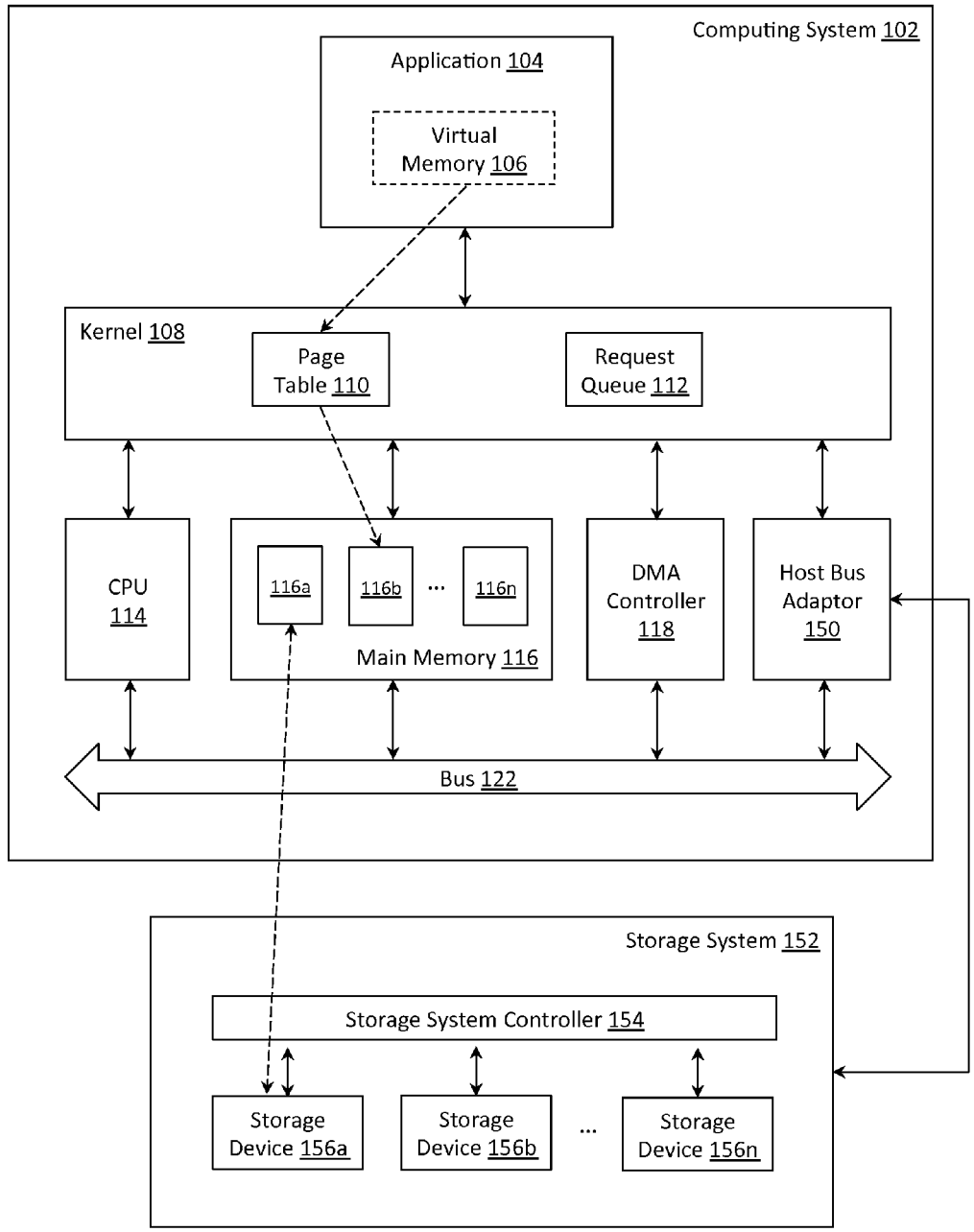
FIG. 4 depicts a computer system after a memory swap operation, in accordance with one embodiment of the invention.
Figure 5:
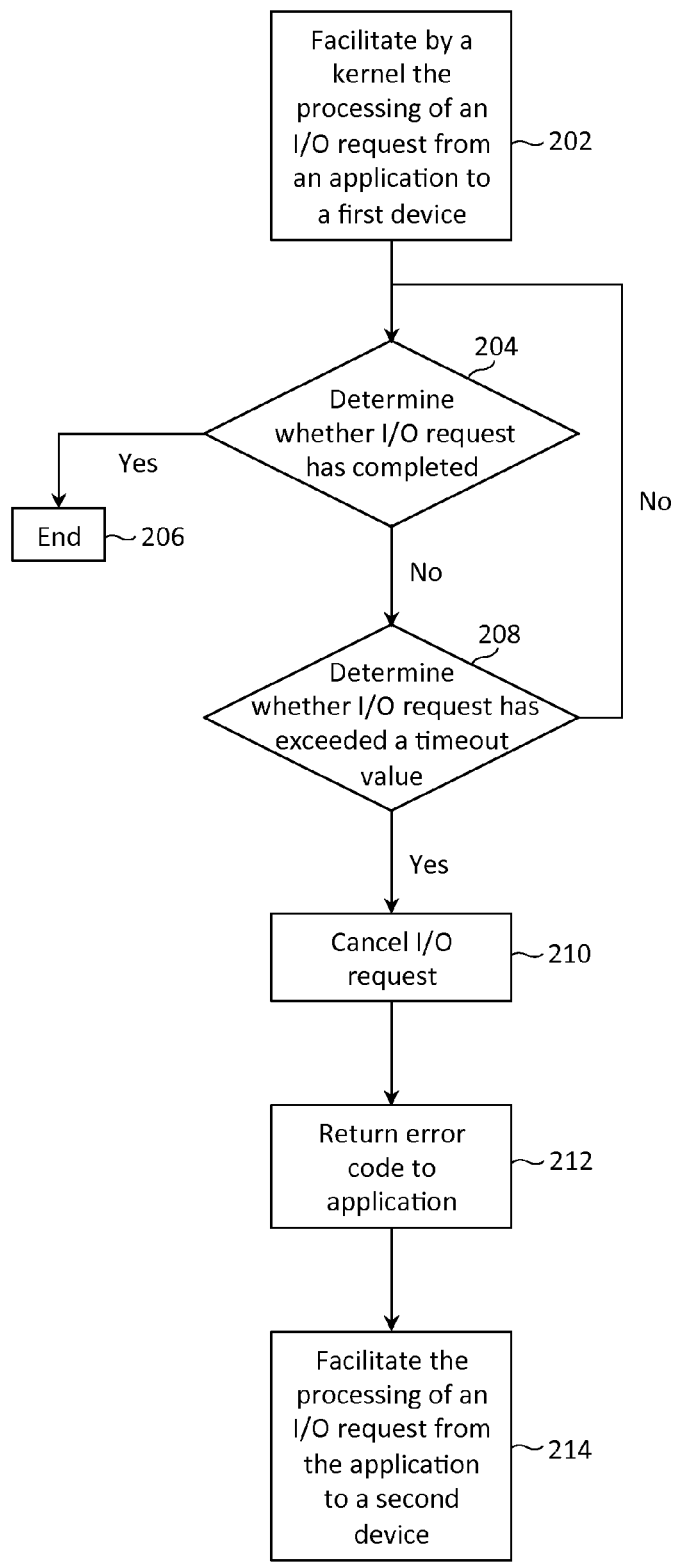
FIG. 5 depicts a flow diagram of a process for processing an I/O request, within which the I/O request may be cancelled, in accordance with one embodiment of the invention.

FIG. 3 is a specific embodiment of FIG. 1, in which computing system 102 is communicatively coupled to storage system 152. Computing system 102 has a specific I/O controller called a host bus adaptor (HBA) 150. As is known in the art, HBA 150 communicatively couples a host (in this case, components of computing system 102) to one or more storage devices, such as a SCSI, Fibre Channel and/or eSATA storage device.

Storage system 152, in accordance with one embodiment of the invention, includes a plurality of storage devices (156a, 156b, . . . 156n), such as solid-state storage devices (e.g., flash-memory based devices), and magnetic disk storage devices (e.g., hard drives), etc. A storage device may also include a storage appliance. A particular storage appliance may be constructed as an array of JBODs (Just a Bunch Of Disks or Just a Bunch Of Drives), with each JBOD communicatively connected to one another through a controller within the storage appliance. Storage devices (156a, 156b, . . . 156n) may be located at the same geographical location (and could also be co-located within the same chassis), while it is also possible for storage devices (156a, 156b, . . . 156n) to be located at different geographical locations and be communicatively connected with one another via a computer network. The plurality of storage devices may be interfaced to computer system 102 via storage system controller 154.

Similar to the dotted arrow between portion 116a of main memory 116 and first device 124 in FIG. 1, a dotted arrow is shown between portion 116a of main memory 116 and storage device 156a to indicate the direct transfer of data between these two components. More generally, a link may be present between any one of storage devices (156a, . . . , 156n) and any portion (116a, . . . , 116n) of main memory 116. The transfer is direct in the sense that it bypasses any processing of CPU 114. The transfer may be facilitated by DMA controller 118, HBA 150 and storage system controller 154. The dotted arrow between storage device 156a and portion 116a depicted in FIG. 3 is a transitory link (e.g., is associated with a particular I/O request) rather than being a permanent link.

Similar to the description associated with FIG. 1, upon application 104 attempting to cancel an I/O request targeted at storage system 152, storage system 152 may still write a response to the I/O request in portion 116a of main memory 116, such response potentially corrupting virtual memory 106 of application. Similar to FIG. 2, a memory swap operation may be performed, resulting in the embodiment depicted in FIG. 4. Here, virtual memory 106 is re-assigned to portion 116b. Even if storage system 152 were to return a response to the I/O request and write in portion 116a, virtual memory 106 of application 104 would not be corrupted, due to the memory swap operation.

FIGS. 5-9 present flow diagrams of processes that may be performed in association with the system diagrams of FIGS. 1-4. At step 202, a kernel (or more generally a processor) may facilitate the processing of an I/O request from an application (i.e., a user-space I/O request) to a first device. As part of a read request, the application may specify a first virtual address within its virtual memory at which a response to the read request is to be stored. The kernel may translate the first virtual address into a first physical address within the first portion of the main memory. The kernel may additionally instruct the DMA controller to store any response to the read request at the first physical address within the first portion of the main memory. As part of a write request, the application may specify a first virtual address within its virtual memory from which data is to be written to the first device. The kernel may translate the first virtual address into a first physical address within the first portion of the main memory. The kernel may additionally instruct the DMA controller to transmit data from the first physical address within the first portion of the main memory to the first device. As part of step 202, the kernel may further place the I/O request (whether it may be a read or write request) into a request queue.

At step 204, the kernel may determine whether the I/O request has been completed (e.g., a read request may be completed when a response has been returned from the first device and the response has been stored in the main memory or a write request may be completed when a data transfer to the first device has successfully completed). If so, the process ends (step 206). If the I/O request has not been completed, the kernel may determine (step 208) whether the I/O request has exceeded a timeout value. The timeout value may depend on whether the I/O request is a read or write request. In some embodiments, the timeout value for a read request may be shorter in duration than the timeout value for a write request. Further, each I/O request may have an associated timeout value.

If the I/O request has not exceeded the timeout value, the kernel may repeat step 204 and determine whether the I/O request has completed. If the I/O request has exceeded the timeout value, the kernel may cancel the I/O request (step 210). Details regarding the cancellation of a read request are provided in FIG. 6 and details regarding the cancellation of a write request are provided in FIG. 8. Upon canceling the I/O request, the kernel may return an error code to the application (step 212). Specific error codes are known in the art and need not be described further. Upon receiving the error code, the application receives confirmation that its I/O request has been successfully canceled and may proceed to reissue the I/O request to a second device. At step 214, the kernel may facilitate the processing of the re-issued I/O request to the second device. For example, the kernel may place the re-issued I/O request into the request queue.

Figure 6:
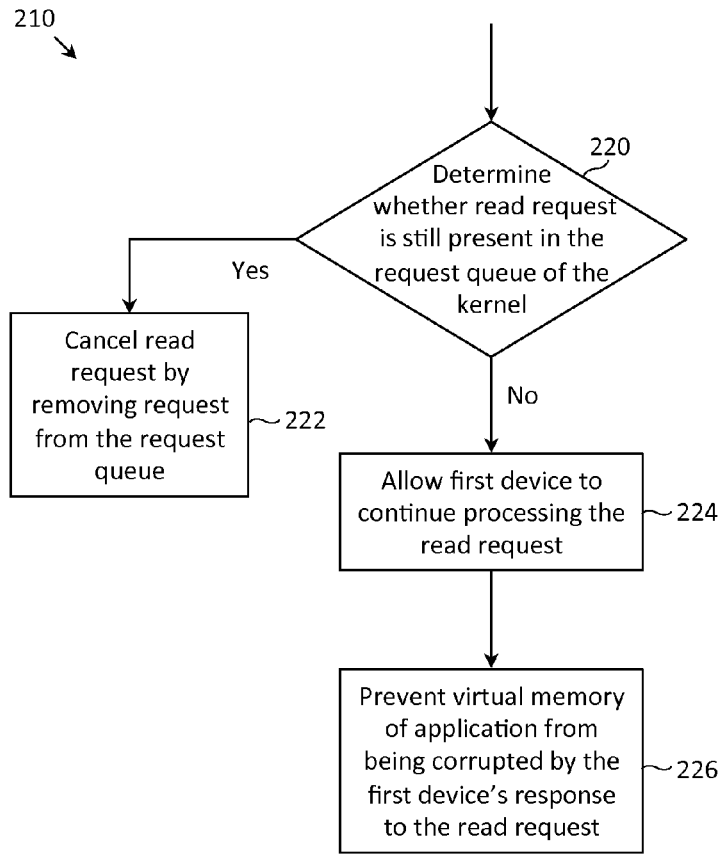
FIG. 6 depicts a flow diagram of a process for cancelling a read request, in accordance with one embodiment of the invention.

FIG. 6 depicts a routine to cancel a read request, in accordance with one embodiment of the invention. At step 220, the kernel may determine whether the read request is still present in the request queue. If so, the kernel may cancel the read request by removing the request from the request queue (step 222). If the read request is no longer present in the request queue, it is presumed that the read request is already being processed by the first device. As such, the kernel may allow the first device to continue processing the read request (step 224). At step 226, the kernel may prevent the virtual memory of the application from being corrupted by the first device's response to the read request. A memory swap operation associated with the cancellation of a read request may be performed at step 226 and is further described in FIG. 7. It is noted that step 226 has been depicted after step 224 for ease of illustration, while in practice, step 226 typically occurs simultaneously with step 224.

Figure 7:
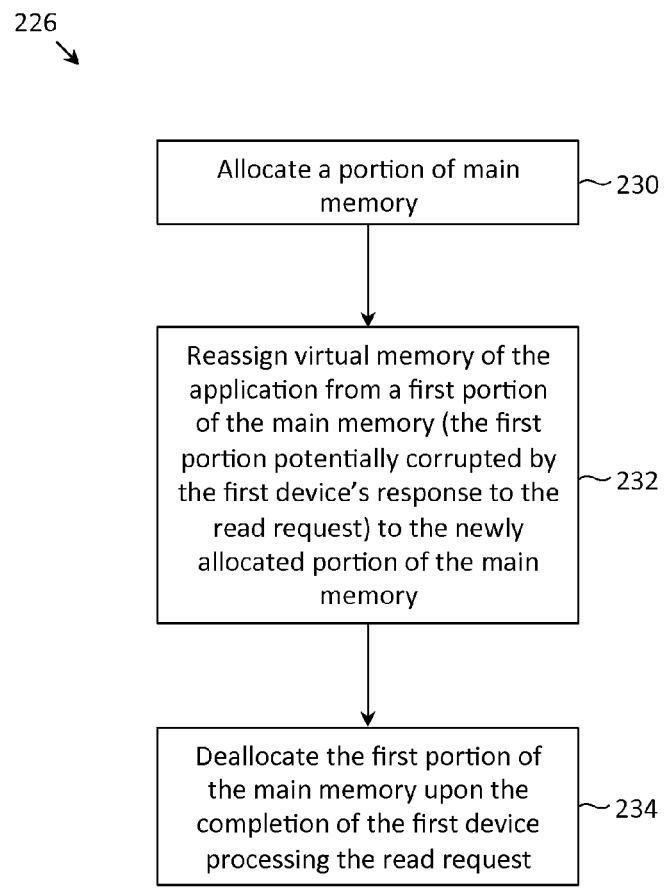
FIG. 7 depicts a flow diagram of a memory swap operation to prevent the virtual memory of an application from being corrupted, in accordance with one embodiment of the invention.

FIG. 7 depicts a memory swap operation, associated with the cancellation of a read request, to prevent the virtual memory of the application from being corrupted, in accordance with one embodiment of the invention. At step 230, the kernel may allocate a portion of the main memory. At step 232, the kernel may reassign the virtual memory of the application from the first portion of the main memory (the first portion potentially corrupted by the first device's response to the read request) to the newly allocated portion of the main memory. As part of step 232, the contents (i.e., the data stored therein) of the first portion of the main memory may be copied over to the newly allocated portion of the main memory. Therefore, from the perspective of the application, its virtual memory (or more specifically the contents thereof) may be unchanged as a result of the memory swap operation. At step 234, the kernel may deallocate the first portion of the main memory upon the completion of the first device processing the read request, freeing the first portion to be used by the kernel, the application or other computer programs.

Figure 8:
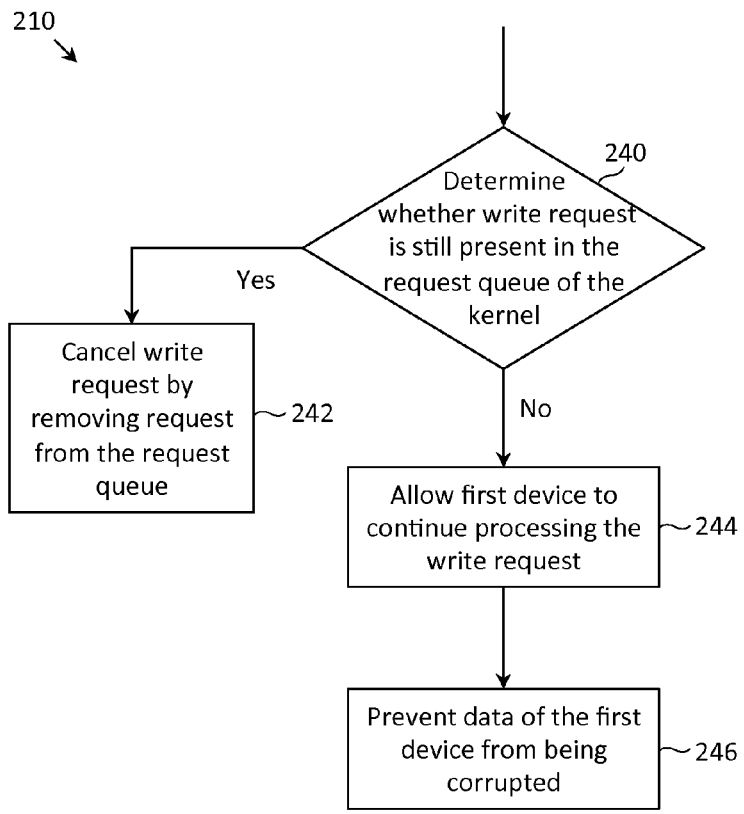
FIG. 8 depicts a flow diagram of a process for cancelling a write request, in accordance with one embodiment of the invention.

FIG. 8 depicts a routine to cancel a write request, in accordance with one embodiment of the invention. At step 240, the kernel may determine whether the write request is still present in the request queue. If so, the kernel may cancel the write request by removing the request from the request queue (step 242). If the write request is no longer present in the request queue, it is presumed that the write request is already being processed by the first device. As such, the kernel may allow the first device to continue processing the write request (step 244). At step 246, the kernel may prevent the contents (i.e., the data stored thereon) of the first device from being corrupted by performing a memory swap operation, further described in FIG. 9. It is noted that step 246 has been depicted after step 244 for ease of illustration, while in practice, step 246 typically occurs simultaneously with step 244.

To emphasize, in the cancellation of a write request, it is the potential corruption of the contents of the first device that is the primary concern rather than the potential corruption of the virtual memory of the application, as is the case for the cancellation of a read request. More specifically, the concern is that the first portion of main memory will be released (e.g., made available for other uses), even while data is still being written from the first portion of main memory to the first device. If new data is written to the first portion of main memory, such new data may be inadvertently written to the first device (i.e., written to a storage device of the first device whether it may be RAM, a hard drive, etc.), corrupting the contents (i.e., the data stored thereon) of the first device. The memory swap operation of FIG. 9 alleviates these potential issues.

Figure 9:
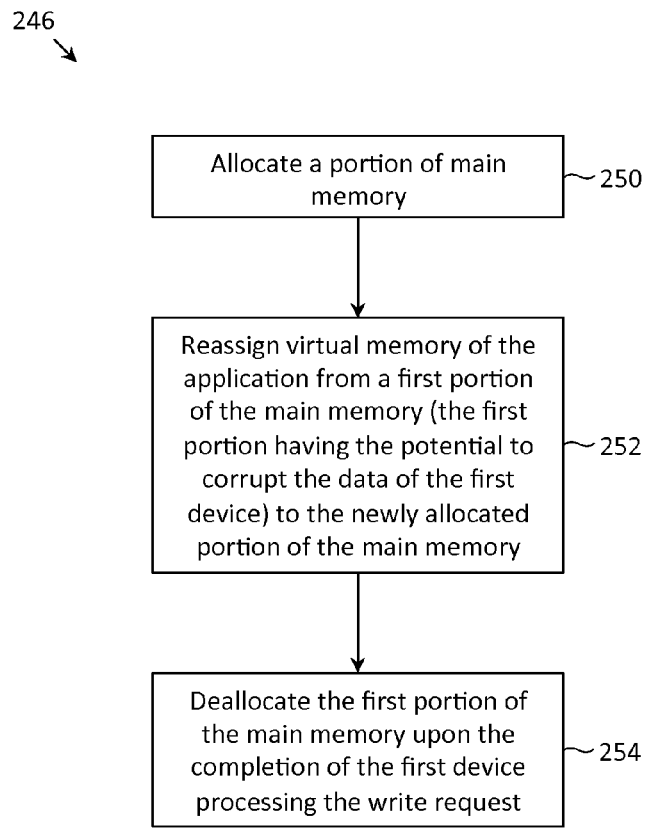
FIG. 9 depicts a flow diagram of a memory swap operation to prevent data of an external device from being corrupted, in accordance with one embodiment of the invention.

FIG. 9 depicts a memory swap operation, associated with the cancellation of a write request, to prevent the data of the first device from being corrupted, in accordance with one embodiment of the invention. At step 250, the kernel may allocate a portion of the main memory. At step 252, the kernel may reassign the virtual memory of the application from the first portion of the main memory (the first portion having the potential to corrupt the data of the first device) to the newly allocated portion of the main memory. As part of step 252, the contents of the first portion of the main memory may be copied over to the newly allocated portion of the main memory. Therefore, from the perspective of the application, its virtual memory (or more specifically the contents thereof) may be unchanged as a result of the memory swap operation. At step 254, the kernel may deallocate the first portion of the main memory upon the completion of the first device processing the write request, freeing the first portion to be used by the kernel, the application or other computer programs.

Figure 10:
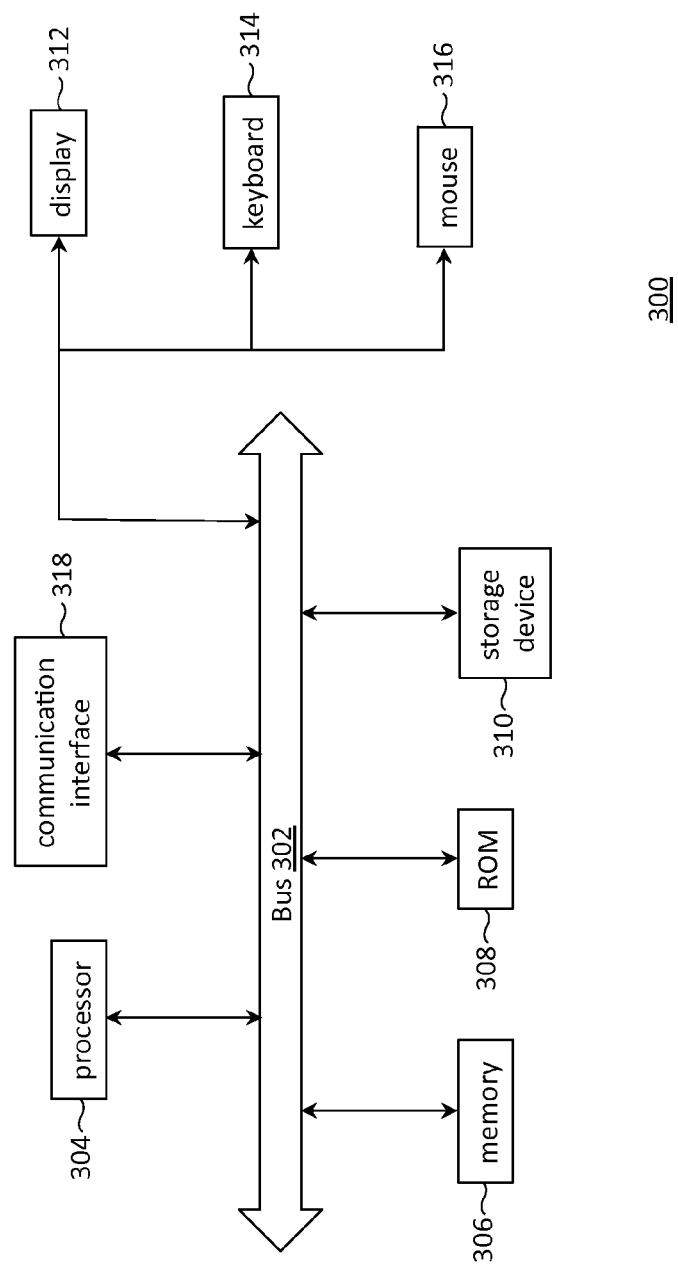
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of a system 300 that is representative of any of the computing systems and I/O devices discussed herein. Further, computer system 300 is representative of a system that performs any of the processes depicted in FIGS. 5-9. Note, not all of the various computer systems and I/O devices may have all of the features of system 300. For example, certain of the computer systems discussed above may not include a display inasmuch as the display function may be provided by a client computer communicatively coupled to the computer system or a display function may be unnecessary. Such details are not critical to the present invention.

System 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 304 can read, is provided and coupled to the bus 302 for storing information and instructions (e.g., operating systems, applications programs and the like).

Computer system 300 may be coupled via the bus 302 to a display 312, such as a flat panel display, for displaying information to a computer user. An input device 314, such as a keyboard including alphanumeric and other keys, is coupled to the bus 302 for communicating information and command selections to the processor 204. Another type of user input device is cursor control device 316, such as a mouse, a trackball, or cursor direction keys for communicating direction information and command selections to processor 304 and for controlling cursor movement on the display 312. Other user interface devices, such as microphones, speakers, etc. are not shown in detail but may be involved with the receipt of user input and/or presentation of output.

The processes referred to herein may be implemented by processor 304 executing appropriate sequences of computer-readable instructions contained in main memory 306. Such instructions may be read into main memory 306 from another computer-readable medium, such as storage device 310, and execution of the sequences of instructions contained in the main memory 306 causes the processor 304 to perform the associated actions. In alternative embodiments, hard-wired circuitry or firmware-controlled processing units (e.g., field programmable gate arrays) may be used in place of or in combination with processor 304 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 300 or similar electronic computing device, that manipulates and transforms data represented as physical (electronic) quantities within its registers and memories into other data similarly represented as physical quantities within its memories or registers or other such information storage, transmission or display devices.

Computer system 300 also includes a communication interface 318 coupled to the bus 302. Communication interface 318 provides a two-way data communication channel with a computer network, which provides connectivity to and among the various computer systems discussed above. For example, communication interface 318 may be a local area network (LAN) card to provide a data communication connection to a compatible LAN, which itself is communicatively coupled to the Internet through one or more Internet service provider networks. The precise details of such communication paths are not critical to the present invention. What is important is that computer system 300 can send and receive messages and data through the communication interface 318 and in that way communicate with hosts accessible via the Internet.

The follow description further motivates the improved I/O cancellation technique. When storing data on disks, whether they are solid state or rotating media, storage systems typically either replicate data, or use parity or erasure codes to make the data storage more reliable (i.e., prevent the loss of data when there are drive failures). For example on hard drives, error correcting codes (ECCs) may be used to detect and correct bit errors. If there are some difficulties in retrieving the data, more processing-intensive algorithms may be employed to improve the chances of successfully retrieving the data. This is evident in the case of flash-based storage, where the shortest and longest read completion times may differ by a few orders of magnitude. The drive firmware itself can have some bugs, and can fail. To recover, the drive might need to reload, which takes time. In short, there are often times when a drive takes a long time to complete a given request. Such occurrences should not be considered as drive failures since they can be recovered easily. While a drive is going through this phase, if the drive is inundated with requests, it can result in the failure of the drive. From the perspective of the users who submit read requests to the storage system, these users will see increased latency in their requests when a drive is going through this phase. This is not acceptable to most users, who want guaranteed service times.

To address this problem, the above-described I/O cancellation technique may be employed. Suppose on behalf of a user request, an application submits a request to a first drive. Instead of actively waiting for the response, the application can set a time limit for request, perform other tasks, and return after the time limit to see whether the request has been processed. If the first drive does not respond to the request in the allotted time, the kernel may cancel the request using the above-described I/O cancellation technique and may return a known error code to the application. In response, the application can serve the user request to a second drive. As cancelling a request does not involve cancelling the request at the first drive or resetting the first drive, this gives enough time for the first drive to recover. During the time the first drive is recovering, the application can choose to not submit requests to the first drive to avoid long wait times.

Thus, methods and systems for processing I/O requests, more specifically techniques for cancelling I/O requests, have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   receiving an input/output (I/O) request, the I/O request instructing a transfer of data between a first portion of a main memory of a computing system and an I/O device;
   receiving a cancellation request to cancel the I/O request;
   in response to the cancellation request, preventing an application executing on the computing system from accessing the first portion of the main memory, while leaving the first portion of the main memory accessible to the I/O device;
   prior to the cancellation request being received, mapping a virtual memory of the application to the first portion of the main memory; and
   subsequent to the cancellation request being received, reassigning the virtual memory of the application from the first portion of the main memory to a second portion of the main memory.

2. The method of claim 1, further comprising:
   subsequent to the cancellation request being received, accessing by the I/O device the first portion of the main memory.

3. The method of claim 2, wherein the I/O device accesses the first portion of the main memory via a direct memory access (DMA) controller and an I/O controller of the computing system.

4. The method of claim 3, further comprising:
   subsequent to the cancellation request being received, writing data by the DMA controller from the I/O device to the first portion of the main memory.

5. The method of claim 1, wherein reassigning the virtual memory comprises manipulating a page table of the computing system.

6. A computing system, comprising a processor, a main memory communicatively coupled to the processor, and a set of instructions on the main memory that, when executed by the processor, cause the processor to:
   receive an input/output (I/O) request, the I/O request instructing a transfer of data between a first portion of the main memory of the computing system and an I/O device;
   receive a cancellation request to cancel the I/O request;
   in response to the cancellation request, prevent an application executing on the computing system from accessing the first portion of the main memory, while leaving the first portion of the main memory accessible to the I/O device;
   prior to the cancellation request being received, map a virtual memory of the application to the first portion of the main memory; and
   subsequent to the cancellation request being received, reassign the virtual memory of the application from the first portion of the main memory to a second portion of the main memory.

7. The computing system of claim 6, wherein a communication path between the I/O device and the main memory of the computing system communicatively couples the I/O device to the first portion of the main memory.

8. The computing system of claim 7, wherein the communication path between the I/O device and the main memory of the computing system comprises a direct memory access (DMA) controller and an I/O controller of the computing system.

9. The computing system of claim 8, wherein the DMA controller is configured to, subsequent to the cancellation request being received, write data from the I/O device to the first portion of the main memory.

10. The computing system of claim 6, wherein reassigning the virtual memory comprises manipulating a page table of the computing system.

11. A non-transitory machine-readable storage medium for a computing system having a processor and a main memory communicatively coupled to the processor, the non-transitory machine-readable storage medium comprising software instructions that, when executed by the processor, cause the processor to:
   receive an input/output (I/O) request, the I/O request instructing a transfer of data between a first portion of the main memory of the computing system and an I/O device;
   receive a cancellation request to cancel the I/O request;
   in response to the cancellation request, prevent an application executing on the computing system from accessing the first portion of the main memory, while leaving the first portion of the main memory accessible to the I/O device;
   prior to the cancellation request being received, map a virtual memory of the application to the first portion of the main memory; and
   subsequent to the cancellation request being received, reassign the virtual memory of the application from the first portion of the main memory to a second portion of the main memory.

12. The non-transitory machine-readable storage medium of claim 11, wherein reassigning the virtual memory comprises manipulating a page table of the computing system.

* * * * *